Jan. 20, 1931.  H. L. WALKER  1,789,484
SUSPENSION DEVICE
Filed Aug. 11, 1928
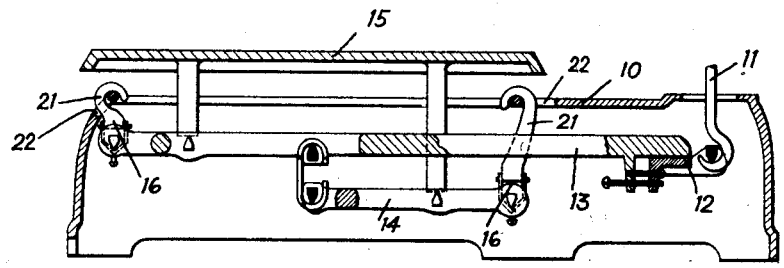
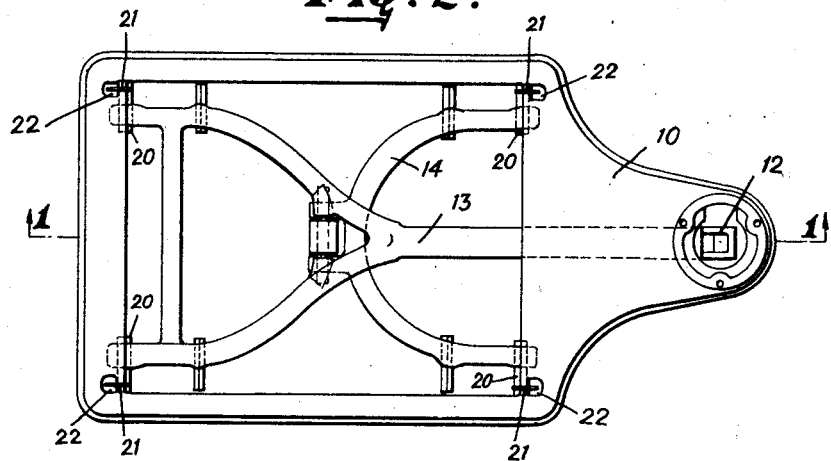
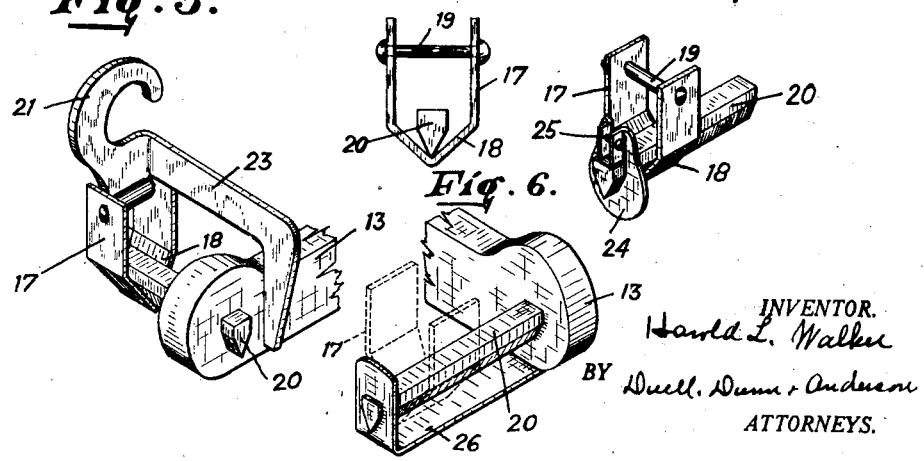
INVENTOR.
Harold L. Walker
BY Duell, Dunn & Anderson
ATTORNEYS.

Patented Jan. 20, 1931

1,789,484

UNITED STATES PATENT OFFICE

HAROLD L. WALKER, OF BROOKLYN, NEW YORK, ASSIGNOR TO THE JACOBS BROS. CO., INC., OF BROOKLYN, NEW YORK, A CORPORATION OF NEW YORK

SUSPENSION DEVICE

Application filed August 11, 1928. Serial No. 298,906.

This invention relates to scales and specifically aims to provide an improved type of suspension device for use in this connection.

It is an object of the invention to furnish a suspension device which may be constructed readily and cheaply and which, when used, will not require the usual skilled effort for the "setting" of the beam or other parts supported thereby and by means of which, also, fewer parts may be employed.

A further object of the invention is that of constructing a device of this character by means of which the several scale parts associated therewith will be prevented from accidental displacement relative to each other, this object being achieved by improved types of construction.

With these and further objects in mind reference is had to the attached sheet of drawings illustrating practical embodiments of the invention and in which:

Figure 1 is a sectional side view through the base of a platform type scale;

Figure 2 is a bottom plan view thereof;

Fig. 3 is a perspective view of the suspension device showing one form of guard in association therewith;

Fig. 4 is a front view of the suspension device, and

Figs. 5 and 6 are views similar to Fig. 3 but show forms of guards different from that illustrated in the preceding figure.

While in Figs. 1 and 2 the invention has been shown as utilized in connection with a platform type of scale, it will be hereinafter obvious that the suspension device might be advantageously employed in connection with any number of types of scales. Thus, in the figures referred to the numeral 10 indicates a base housing from which an actuating rod 11 extends, the latter being suitably connected as at 12 to a beam 13, which beam, in conjunction with an auxiliary beam 14, supports a platform 15. The beams 13 and 14 are in turn supported by a suspension device or unit indicated generally at 16.

With reference to this unit it will be observed, as in Figure 4, that the same may include a strip of metal as, for example, steel, the body of which may be hardened and which is bent to provide a U-shaped body including arms 17 and a base having angularly extending surfaces 18. The arms 17 may be connected by a bolt or rivet element 19 and thus a loop is furnished into which there may be introduced a bearing pin 20 of the knife edge type and the faces of which are disposed at a more acute angle than the angle of the faces 18 providing the base of the member. Thus, it is unnecessary to employ bearing material in that, by having the loop member of suitably hardened steel this may be dispensed with. Furthermore, as a consequence of not employing the bearing material and instead, utilizing stamped parts, it will be obvious that it will not be necessary to resort to the same effort in order to true and set up the various scale parts.

The loop member may be supported as, for example, by utilizing a suspension hook attached to the bolt 19 and which hook will pass through an opening 22 provided for this purpose in the scale base.

According to the present invention the body of the hook member may be extended to provide an inwardly and downwardly projecting portion 23 extending beyond the beam and serving to prevent relative dislodgment of the parts which, as is wellknown, have heretofore often been displaced during shipping and if, instead of extending the hook member it is desired to resort to some other expedient, this may likewise be accomplished by simply attaching to the knife edge member 20 a guard plate 24 which is formed with an opening for the accommodation of the end of this member and may be clamped in position as, for example, by a screw 25. The size of this guard is such that it may not pass through the loop and thus, despite excessive vibration the parts will obviously not be dislodged at any time.

Finally, with reference to the form of construction shown in Fig. 6, it will be observed that a guard has been illustrated, which is identified by the numeral 26, and has its inner end secured, for example, to the beam, its outer end extending at right angles and being provided with an opening to accommodate the end of the bearing pin 20. This guard element may be rendered detachable in any desirable manner as, for example, securing the same to the beam by means of a screw (not shown). Obviously, with the loop member in position as indicated in dotted lines, an accidental dislodgment of the several parts will be precluded.

From the foregoing it will be appreciated that the specific objects hereinbefore mentioned are achieved. It is intended, however, that numerous changes in construction and rearrangement of the parts might be resorted to without departing from the spirit of the invention as defined by the claims.

Having described my invention, what I claim as new and desire to secure by Letters Patent is:—

1. A suspension device including a loop member, a hook shaped element attached to the same and an outwardly and downwardly extending portion forming a part of said hook shaped element and a knife edge member extending within said loop member and said downwardly extending portion lying adjacent said knife edge member.

2. In a scale, in combination, a rockingly mounted beam, a support, a pivot member extending from one of said elements, a cooperating bearing member associated with the second of the same, and means secured to one of said members and extending beyond the second of the same for preventing accidental relative displacement of said members.

3. A scale including, in combination, a beam, a support, a plurality of pivot members extending from one of said elements, a plurality of cooperating bearing members associated with the second of the same, and a plurality of guard means carried one by each of certain of said members and extending beyond the members cooperating therewith to prevent relative displacement of said members, said guard means being one independent of the other.

4. A scale including, in combination, a platform, a support for said platform, beams, suspension members carried by said support and including bearing portions, pivot elements associated with said beams and riding upon said portions, and means individual to each of said cooperating bearings and pivots, associated with one of the same and extending beyond the second to prevent relative displacement of said bearings and pivots.

5. A scale including, in combination, a platform, a support for said platform, beams, suspension members carried by said support and including bearing portions, pivot elements associated with said beams and riding upon said portions, and means associated one with each of said bearing members and individual thereto, and extending to a point beyond the end of the pivot member associated therewith to prevent relative displacement of said bearings and pivots.

6. In a scale, in combination, a bearing member, a pivot element cooperating with said member, and a unitary suspension device for said bearing member and guard extending to a point beyond said pivot for preventing displacement of the latter from said bearing member.

7. A suspension device for use in scales including a bearing member, a pivot member riding upon the same and to be secured to a scale part, a guard comprising a hook shaped extension to project beyond the scale part with which said pivot member is associated and to prevent displacement of the latter from said bearing member, and means forming a part of said guard to detachably associate said bearing member with another scale part.

8. A suspension device for use in scales including a bearing member, a pivot member riding upon the same and to be secured to a scale part, a guard comprising a hook shaped extension to project beyond the scale part with which said pivot member is associated and to prevent displacement of the latter from said bearing member, and a hook shaped extension forming a part of said guard and for detachable association with a second scale part to support said bearing member.

In testimony whereof I affix my signature.

HAROLD L. WALKER.